United States Patent
Herman et al.

(10) Patent No.: US 12,269,505 B2
(45) Date of Patent: Apr. 8, 2025

(54) PHOTOMETRIC STEREO FOR VEHICLE NAVIGATION

(71) Applicant: Ford Global Technologies, LLC, Dearborn, MI (US)

(72) Inventors: David Michael Herman, West Bloomfield, MI (US); Larry Sanders, Monroe, MI (US); Binduhasini Sairamesh, Milpitas, CA (US); Akshay Vaidya, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 255 days.

(21) Appl. No.: 18/154,892

(22) Filed: Jan. 16, 2023

(65) Prior Publication Data

US 2024/0239367 A1    Jul. 18, 2024

(51) Int. Cl.
*B60W 60/00* (2020.01)
*B60Q 1/00* (2006.01)
*B60W 40/10* (2012.01)
*G06T 7/593* (2017.01)
*G06V 20/58* (2022.01)

(52) U.S. Cl.
CPC ......... *B60W 60/001* (2020.02); *B60Q 1/0035* (2013.01); *B60W 40/10* (2013.01); *G06T 7/593* (2017.01); *B60W 2520/00* (2013.01); *B60W 2554/00* (2020.02); *B60W 2556/00* (2020.02); *G06T 2207/10152* (2013.01); *G06T 2207/30252* (2013.01); *G06V 20/58* (2022.01)

(58) Field of Classification Search
None
See application file for complete search history.

(56) References Cited

U.S. PATENT DOCUMENTS

| 8,320,616 B2 | 11/2012 | Kaiser et al. |
| 8,723,987 B2 | 5/2014 | Krishnaswamy et al. |
| 11,048,264 B2 | 6/2021 | Li et al. |
| 2020/0314412 A1* | 10/2020 | Fields ............... H04N 23/74 |

(Continued)

FOREIGN PATENT DOCUMENTS

| CN | 114954525 A | 8/2022 |
| EP | 1876829 A1 | 1/2008 |
| WO | 2021007561 A1 | 1/2021 |

OTHER PUBLICATIONS

Chang et al., "Enhanced Depth Map Estimation in Low Light Conditions for RGB Cameras", 2021 18th International SoC Design Conference (ISOCC), https://doi.org/10.1109/ISOCC53507.2021.9613968.

(Continued)

*Primary Examiner* — David P. Merlino
(74) *Attorney, Agent, or Firm* — Frank Lollo; Brooks Kushman P.C.

(57) ABSTRACT

A computer includes a processor and a memory, and the memory stores instructions executable by the processor to sequentially activate a plurality of lamps aimed at a scene, the lamps mounted to a vehicle; receive image data of the scene generated while sequentially activating the lamps; generate a map of surface normals of the scene by executing a photometric stereo algorithm on the image data; and in response to a speed of the vehicle being below a speed threshold, navigate the vehicle based on the map of the surface normals.

20 Claims, 4 Drawing Sheets

(56) References Cited

U.S. PATENT DOCUMENTS

| | | | |
|---|---|---|---|
| 2021/0371260 A1 | 12/2021 | Chien et al. | |
| 2022/0172388 A1* | 6/2022 | Ishimatsu | G06T 7/11 |
| 2022/0176980 A1* | 6/2022 | Fujimoto | G06F 1/20 |
| 2023/0204781 A1* | 6/2023 | Thakur | G01S 17/894 |
| | | | 356/5.01 |

OTHER PUBLICATIONS

Wehrwein, "CS4670/5760: Computer Vision—Lecture 23: Photometric Stereo", Mar. 25, 2015, http://www.cs.cornell.edu >lec23_photostereo_web.

Cornell, "Photometric stereo", https://www.cs.cornell.edu/courses/cs4670/2018sp/lec25-photometric-stereo.pdf.

Li et al., "Research Article—A Lightweight Stereo Visual Odometry System for Navigation of Autonomous Vehicles in Low-Light Conditions", HindawiWireless Communications and Mobile Computing vol. 2022, Article ID 5249449, 14 pages https://doi.org/10.1155/2022/5249449.

Logothetis et al., "Near-Field Photometric Stereo in Ambient Light", Conference Paper • Sep. 2016 DOI: 10.5244/C.30.61.

Shi et al., "Self-calibrating Photometric Stereo", 2010 IEEE Computer Society Conference on Computer Vision and Pattern Recognition. IEEE, 2010.

Srinivas et al., "Low-light pedestrian detection from RGB images using multi-modal knowledge distillation", 2017 IEEE International Conference on Image Processing(ICIP), DOI 10.109/ICIP.2017.8297075.

Vlasic et al., "Dynamic Shape Capture using Multi-View Photometric Stereo", https://gfx.cs.princeton.edu/pubs/Vlasic_2009_DSC/perfcap.pdf.

Wang et al., "Photometric Stereo with Small Angular Variations", this ICCV paper is the Open Access version, provided by the Computer Vision Foundation. Except for this watermark, it is identical to the version available on IEEE Xplore.

Wu et al., "Use of non-photorealistic rendering and photometric stereoin making bas-reliefs from photographs", Graphical Models 76 (2014) 202-213, www.elsevier.com/locate/gmod.

Yoo et al., "Flicker removal for CMOS wide dynamic range imaging based on alternating current component analysis", IEEE Transactions on Consumer Electronics—Aug. 2014, DOI: 10.1109/TCE.2014.6937311.

* cited by examiner

PHOTOMETRIC STEREO FOR VEHICLE NAVIGATION

BACKGROUND

Vehicles include lamps for illuminating the environment through which the vehicle is traveling and for signaling turning, braking, etc. to other vehicles. Types of lamps include light-emitting diode (LED), tungsten, halogen, high-intensity discharge (HID) such as xenon, laser, etc.

DETAILED DESCRIPTION

This disclosure describes techniques useful for determining how to navigate a vehicle in a situation-dependent manner. A computer of the vehicle may be programmed to sequentially activate a plurality of lamps of the vehicle aimed at a scene, receive image data of the scene generated while sequentially activating the lamps, generate a map of surface normals of the scene by executing a photometric stereo algorithm on the image data, and in response to a speed of the vehicle being below a speed threshold, navigate the vehicle based on the map of the surface normals. Generating the map of surface normals with the sequential activation of the lamps may provide enhanced information about the scene compared to other techniques in certain situations, e.g., low-light environments. When the speed is above the speed threshold, the computer may navigate the vehicle based on other sources of information about the scene, or the computer may instruct an operator to navigate the vehicle. The sequential activation of the lamps may provide data about objects in the scene within a distance that can be illuminated by the lamps, making the photometric stereo more suitable for lower speeds. The computer may select an appropriate source of data for navigating the vehicle based on the situation and navigate the vehicle accordingly.

A computer includes a processor and a memory, and the memory stores instructions executable by the processor to sequentially activate a plurality of lamps aimed at a scene, the lamps mounted to a vehicle; receive image data of the scene generated while sequentially activating the lamps; generate a map of surface normals of the scene by executing a photometric stereo algorithm on the image data; and in response to a speed of the vehicle being below a speed threshold, navigate the vehicle based on the map of the surface normals.

In an example, the instructions to receive the image data may include instructions to receive the image data as captured with a rolling shutter. In a further example, the instructions to sequentially activate the lamps may include instructions to sequentially activate the lamps at a lamp activation rate that is faster than a frame rate of the image data and slower than or equal to a line rate of the rolling shutter. In a yet further example, the image data may include a series of image frames, the image frames may be composed of lines, and the instructions to execute the photometric stereo algorithm may include instructions to interlace a subset of the lines from consecutive ones of the image frames, the subset of lines being captured while a same one of the lamps is activated.

In an example, the instructions may further include instructions to, while sequentially activating the lamps, deactivate each lamp before activating a next one of the lamps.

In an example, the plurality of the lamps may include at least three lamps.

In an example, the instructions may further include instructions to generate a depth map of the scene based on the map of the surface normals and, in response to the speed of the vehicle being below the speed threshold, navigate the vehicle based on the depth map.

In an example, the instructions may further include instructions to identify an object in the scene based on the map of the surface normals and, in response to the speed of the vehicle being below the speed threshold, navigate the vehicle based on the identification of the object.

In an example, the instructions may further include instructions to determine an ambient light level and, in response to the speed of the vehicle being below the speed threshold and the ambient light level being below a light threshold, navigate the vehicle based on the map of the surface normals. In a further example, the speed threshold may be variable, and the instructions may further include instructions to determine the speed threshold based on the ambient light level. In a yet further example, the speed threshold may decrease as the ambient light level increases up to the light threshold.

In an example, the instructions may further include instructions to determine a distance to an object in the scene and, in response to the speed of the vehicle being below the speed threshold and the distance to the object being below a distance threshold, navigate the vehicle based on the map of the surface normals. In a further example, the instructions may further include instructions to determine an ambient light level and, in response to the speed of the vehicle being below the speed threshold, the distance to the object being below the distance threshold, and the ambient light level being below a light threshold, navigate the vehicle based on the map of the surface normals.

In another further example, the speed threshold may be variable, and the instructions may further include instructions to determine the speed threshold based on the distance to the object. In a yet further example, the speed threshold may decrease as the distance increases up to the distance threshold.

In an example, the instructions may further include instructions to determine that an autonomous-operation feature of the vehicle is active and, in response to the speed of the vehicle being below the speed threshold and the autonomous-operation feature being active, navigate the vehicle based on the map of the surface normals according to the autonomous-operation feature. In a further example, the autonomous-operation feature may be remote park assist.

In another further example, the autonomous-operation feature may be navigating the vehicle to a charging location.

In another further example, the autonomous-operation feature may be navigating the vehicle to hitch a trailer to the vehicle.

A method includes sequentially activating a plurality of lamps aimed at a scene, the lamps mounted to a vehicle; receiving image data of the scene generated while sequentially activating the lamps; generating a map of surface normals of the scene by executing a photometric stereo algorithm on the image data; and in response to a speed of the vehicle being below a speed threshold, navigating the vehicle based on the map of the surface normals.

With reference to the Figures, wherein like numerals indicate like parts throughout the several views, a computer 205 includes a processor and a memory, and the memory stores instructions executable by the processor to sequentially activate a plurality of lamps 105 aimed at a scene, the lamps 105 mounted to a vehicle 100; receive image data 300 of the scene generated while sequentially activating the lamps 105; generate a map of surface normals of the scene by executing a photometric stereo algorithm on the image data 300; and in response to a speed of the vehicle 100 being below a speed threshold, navigate the vehicle 100 based on the map of the surface normals.

Figure 1:
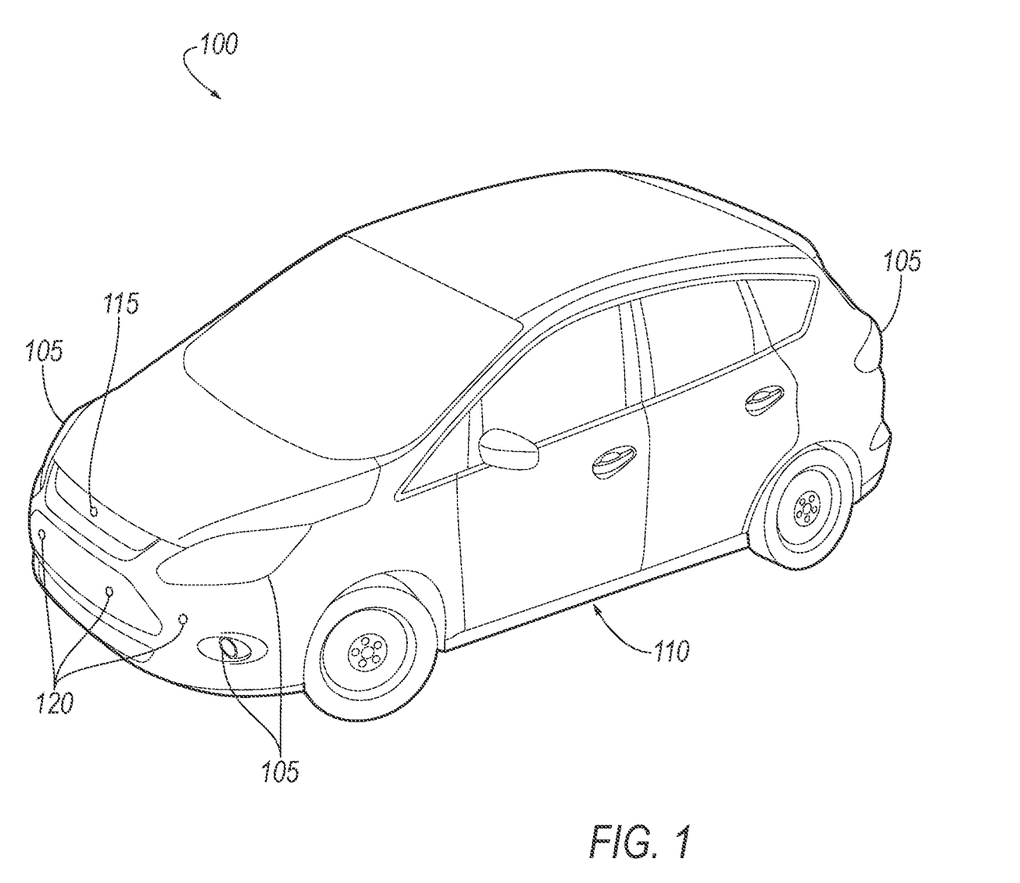
FIG. 1 is a perspective view of an example vehicle.

With reference to FIG. 1, the vehicle 100 may be any passenger or commercial automobile such as a car, a truck, a sport utility vehicle, a crossover, a van, a minivan, a taxi, a bus, etc.

The vehicle 100 includes a body 110. The vehicle 100 may be of a unibody construction, in which a frame and the body 110 of the vehicle 100 are a single component. The vehicle 100 may, alternatively, be of a body-on-frame construction, in which the frame supports the body 110 that is a separate component from the frame. The frame and body 110 may be formed of any suitable material, for example, steel, aluminum, etc.

The lamps 105 may be any type suitable for illuminating a scene around the vehicle 100, e.g., light-emitting diode (LED), tungsten, halogen, high-intensity discharge (HID) such as xenon, laser, etc. In particular, the lamps 105 can be light-emitting diodes.

The lamps 105 are mounted to the vehicle 100, e.g., to the body 110 of the vehicle 100. The lamps 105 may serve different purposes for the vehicle 100. For example, the lamps 105 may include headlamps for illuminating a roadway ahead of the vehicle 100. The headlamps may be disposed at a front end of the vehicle 100 and aimed forward and slightly downward. A headlamp may include multiple lamps 105, e.g., multiple LEDs. For another example, the lamps 105 may include foglamps disposed below the headlamps on the front end of the vehicle 100. For another example, the lamps 105 may include turn signals for indicating an intention to turn the vehicle 100. The turn signals may be disposed at or near corners of the vehicle 100 on the front end and the rear end of the vehicle 100. For another example, the lamps 105 may include taillamps for indicating an intention to slow or stop the vehicle 100. The taillamps may be disposed at a rear end of the vehicle 100 and colored red.

The lamps 105 are spaced from each other around the body 110 of the vehicle 100. The number of lamps 105 is at least three and may be four or five or more. A number of lamps 105 above three allows redundancy in the photometric-stereo calculations described below, which increases the robustness of the results of those calculations.

The vehicle 100 may include at least one camera 115. The cameras 115 can detect electromagnetic radiation in some range of wavelengths. For example, the cameras 115 may detect visible light, infrared radiation, ultraviolet light, or some range of wavelengths including visible, infrared, and/or ultraviolet light. For example, the cameras 115 can be charge-coupled devices (CCD), complementary metal oxide semiconductors (CMOS), or any other suitable type. For another example, the cameras 115 may be a time-of-flight (TOF) cameras, which include a modulated light source for illuminating the environment and detect both reflected light from the modulated light source and ambient light to sense reflectivity amplitudes and distances to the scene.

The cameras 115 are mounted to the vehicle 100, e.g., to the body 110 of the vehicle 100. The cameras 115 may be aimed at the same scene as the lamps 105. For example, the cameras 115 and the lamps 105 may be aimed in a forward direction relative to the vehicle 100.

The vehicle 100 may include at least one range sensor 120. The range sensors 120 return range data by detecting distances and respective directions to objects and features of the surrounding environment. For the purposes of this disclosure, "range data" is defined as the data returned by a range sensor 120. The range data may be a point cloud, i.e., a collection of defined points in space. Each point in the point cloud may be specified in three dimensions, e.g., a distance from the sensor to the point, an azimuthal angle, and an elevation angle; Cartesian coordinates; etc. The computer 205 may convert the range data from a reference frame of the respective range sensor 120 to a reference frame relative to the vehicle 100 or relative to the environment.

For example, the range sensors 120 may include radar sensors, lidar sensors, and/or ultrasonic sensors. Radar sensors transmit radio waves and receive reflections of those radio waves to detect physical objects in the environment. The radar sensors can use direct propagation, i.e., measuring time delays between transmission and reception of radio waves, and/or indirect propagation, i.e., Frequency Modulated Continuous Wave (FMCW) method, i.e., measuring changes in frequency between transmitted and received radio waves. A lidar sensor detects distances to objects by emitting laser pulses at a particular wavelength and measuring the time of flight for the pulse to travel to the object and back. The lidar sensor can be any suitable type for providing the lidar data on which the computer 205 can act, e.g., spindle-type lidar, solid-state lidar, flash lidar, etc. Ultrasonic sensors measure distances to features of the environment by emitting ultrasonic sound waves and converting the reflected sound into an electrical signal.

The range sensors 120 are mounted to the vehicle 100, e.g., to the body 110 of the vehicle 100. The range sensors 120 may be aimed at the same scene as the lamps 105. For example, the range sensors 120 and the lamps 105 may be aimed in a forward direction relative to the vehicle 100.

Figure 2:
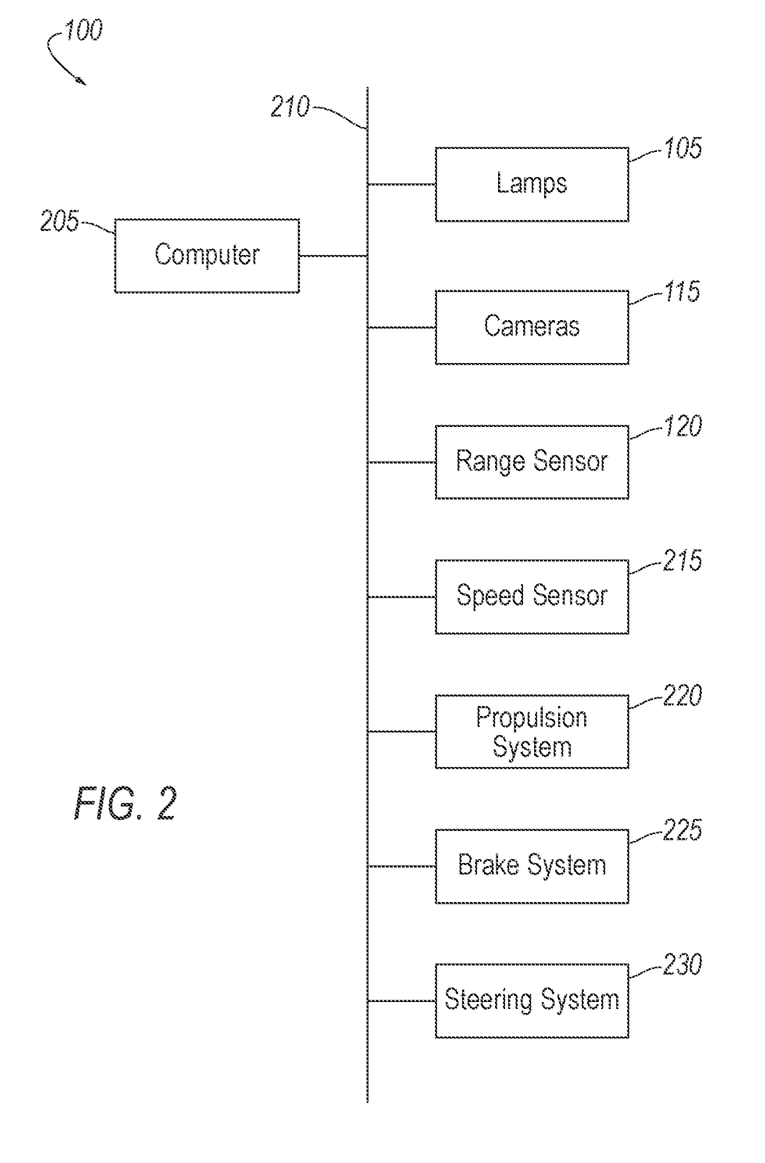
FIG. 2 is a block diagram of the vehicle.

With reference to FIG. 2, the computer 205 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 205 can thus include a processor, a memory, etc. The memory of the computer 205 can include media for storing instructions executable by the processor as well as for electronically storing data and/or databases, and/or the computer 205 can include structures such as the foregoing by which programming is provided. The computer 205 can be multiple computers coupled together.

The computer 205 may transmit and receive data through a communications network 210 such as a controller area network (CAN) bus, Ethernet, WiFi, Local Interconnect Network (LIN), onboard diagnostics connector (OBD-II), and/or by any other wired or wireless communications network. The computer 205 may be communicatively coupled to the lamps 105, the cameras 115, the range sensors 120, a speed sensor 215, a propulsion system 220, a brake system 225, a steering system 230, and other components via the communications network 210.

The speed sensor 215 may be any sensor suitable for measuring the speed of the vehicle 100, for example, as is known, a mechanical or eddy-current speedometer, a vehicle speed sensor, or wheel speed sensors. A vehicle speed sensor may use a magnetic field detector to count interruptions of a magnetic field by a toothed metal disk disposed on a driveshaft of the vehicle 100. A wheel speed sensor may be, e.g., a Hall effect sensor, a rotary encoder, etc., mounted to one of the wheels of the vehicle 100.

The propulsion system 220 of the vehicle 100 generates energy and translates the energy into motion of the vehicle 100. The propulsion system 220 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 220 can include an electronic control unit (ECU) or the like that is in communication with and receives input from the computer 205 and/or a human operator. The human operator may control the propulsion system 220 via, e.g., an accelerator pedal and/or a gear-shift lever.

The brake system 225 is typically a conventional vehicle braking subsystem and resists the motion of the vehicle 100 to thereby slow and/or stop the vehicle 100. The brake system 225 may include friction brakes such as disc brakes, drum brakes, band brakes, etc.; regenerative brakes; any other suitable type of brakes; or a combination. The brake system 225 can include an electronic control unit (ECU) or the like that is in communication with and receives input from the computer 205 and/or a human operator. The human operator may control the brake system 225 via, e.g., a brake pedal.

The steering system 230 is typically a conventional vehicle steering subsystem and controls the turning of the wheels. The steering system 230 may be a rack-and-pinion system with electric power-assisted steering, a steer-by-wire system, as both are known, or any other suitable system. The steering system 230 can include an electronic control unit (ECU) or the like that is in communication with and receives input from the computer 205 and/or a human operator. The human operator may control the steering system 230 via, e.g., a steering wheel.

The vehicle 100 may be an autonomous or semi-autonomous vehicle. The computer 205 may be programmed to operate the vehicle 100 independently of the intervention of a human operator, completely or to a lesser degree. The computer 205 may be programmed to operate the propulsion system 220, the brake system 225, the steering system 230, and/or other vehicle systems. For the purposes of this disclosure, autonomous operation means the computer 205 controls the propulsion system 220, brake system 225, and steering system 230 without needing input from a human operator; semi-autonomous operation means the computer 205 controls one or two of the propulsion system 220, brake system 225, and steering system 230 and a human operator controls the remainder, or that the computer 205 controls all three of the propulsion system 220, the brake system 225, and the steering system 230 but the human operator must be prepared to take over control of the vehicle 100; and nonautonomous operation means a human operator controls the propulsion system 220, brake system 225, and steering system 230.

The vehicle 100 may have at least one autonomous-operation feature, e.g., a plurality of autonomous-operation features. For the purposes of this disclosure, an "autonomous-operation feature" is defined as autonomous operation or semi-autonomous operation of the vehicle 100 under specified conditions. The autonomous-operation features entail the computer 205 actuating the propulsion system 220, the brake system 225, and/or the steering system 230. For example, the autonomous-operation features may include a remote park assist, navigating the vehicle 100 to hitch a trailer to the vehicle 100, and/or navigating the vehicle 100 to a charging location. The autonomous-operation features may include advanced driver assistance systems (ADAS) such as adaptive cruise control or automatic braking. The specified conditions may include a status of the vehicle 100, e.g., gear and/or speed. The specified conditions may include identifying an object relevant to that autonomous-operation feature, e.g., in the manner described below.

The autonomous-operation features may include the remote park assist. The remote park assist autonomously navigates the vehicle 100 into or out of a parking spot, e.g., by actuating the propulsion system 220, the brake system 225, and/or the steering system 230. The specified conditions for the remote park assist may include that the vehicle 100 is running and is stopped or is moving slowly, e.g., has a speed below a threshold. Alternatively, the computer 205 may determine that the vehicle 100 is moving slowly by calculating an optical flow of the image data 300 and determining that the optical flow is below a threshold.

The autonomous-operation features may include navigating the vehicle 100 to hitch a trailer to the vehicle 100. The computer 205 may actuate the propulsion system 220, the brake system 225, and/or the steering system 230 to move the vehicle 100 to a position at which the trailer is able to be hitched to the vehicle 100, e.g., a position at which a coupler of the trailer is able to engage a trailer ball of the vehicle 100. The specified conditions for navigating the vehicle 100 to hitch the trailer to the vehicle 100 may include that the vehicle 100 is running and is in a reverse gear. The specified conditions may further include identifying the coupler of the trailer using object identification as described below.

The autonomous-operation features may include navigating the vehicle 100 to a charging location, e.g., to a wireless charging pad. The computer 205 may actuate the propulsion system 220, the brake system 225, and/or the steering system 230 to move the vehicle 100 to a position at which batteries of the vehicle 100 are able to be charged by the charging location, e.g., a position at which a wireless charging receiver of the vehicle 100 is directly above a wireless charging pad. The specified conditions for navigating the vehicle 100 to the charging location may include that the vehicle 100 is running and is stopped or is moving slowly, e.g., has a speed below a threshold or an optical flow below a threshold. The specified conditions may further include identifying the wireless charging pad using object identification as described below.

Figure 3:
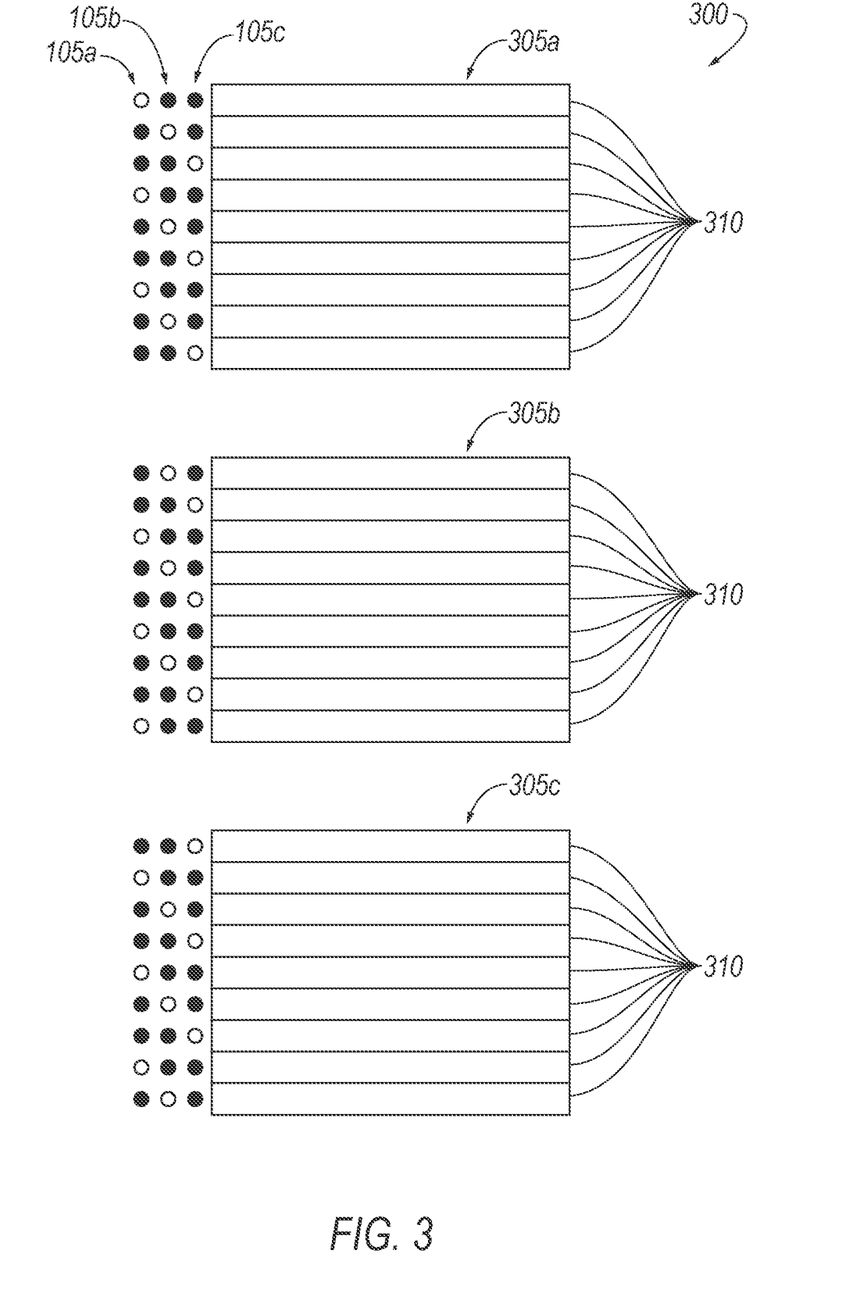
FIG. 3 is a diagram of example image data from a camera of the vehicle.

With reference to FIG. 3, the computer 205 is programmed to receive the image data 300 from one of the cameras 115. The image data 300 are a series of image frames 305 of the field of view of one of the cameras 115.

Each image frame 305 may be a two-dimensional matrix of pixels, e.g., a plurality of pixels arranged in rows and columns. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12-bit or 16-bit scale. The pixels may be a mix of representations, e.g., a repeating pattern of scalar values of intensity for three pixels and a fourth pixel with three numerical color values, or some other pattern. Position in an image frame 305, i.e., position in the field of view of the sensor at the time that the image frame 305 was recorded, can be specified in pixel dimensions or coordinates, e.g., an ordered pair of pixel distances, such as a number of pixels from a top edge and a number of pixels from a left edge of the image frame 305. The computer 205 may apply postprocessing to the image data 300, e.g., a color filtering array, interpolation, adjustments to reduce vignetting, etc.

The image data 300 may be captured with a rolling shutter. The image frames 305 may be composed of lines 310, and the camera 115 may scan across the scene, thereby capturing the image data 300 in the lines 310 in sequence, as opposed to a global shutter in which the image data 300 for all the lines 310 would be captured simultaneously. The lines 310 may be oriented horizontally, as shown in FIG. 3, in which case the camera 115 scans the scene vertically, e.g., top to bottom. Each line 310 may thus be one or more consecutive rows of the pixels. Alternatively, the lines 310 may be oriented vertically, in which case the camera 115 scans the scene horizontally, e.g., left to right. Each line 310 may thus be one or more consecutive columns of the pixels. The lines 310 of the image frame 305 may have some other arrangement. The rolling shutter has a line rate, i.e., a speed at which a line 310 is captured, e.g., measured in lines 310 per unit time or quantity of time for each line 310. The rolling shutter has a frame rate, i.e., a speed at which all the lines 310 in the image frame 305 are captured, e.g., measured in image frames 305 per unit time or quantity of time for each image frame 305.

The computer 205 is programmed to sequentially activate a plurality of the lamps 105 aimed at the scene. The computer 205 may activate one of the lamps 105 (i.e., turn on that lamp 105), then deactivate that lamp 105 (i.e., turn off that lamp 105), then activate a next one of the lamps 105, and so on, i.e., deactivate each lamp 105 before activating the next one of the lamps 105. For example, the lamps 105 may include a first lamp 105a, a second lamp 105b, and a third lamp 105c, and the computer 205 may sequentially activate the lamps 105 by repeatedly (a) activating and then deactivating the first lamp 105a, (b) activating and then deactivating the second lamp 105b, and (c) activating and then deactivating the third lamp 105c. The computer 205 may vary a brightness and/or duration that the lamps 105 are activated. The variations may widen a dynamic range of the photometric stereo algorithm. Using lower-than-full brightness may help measure objects that are shiny.

The computer 205 may sequentially activate the lamps 105 at a lamp activation rate. The lamp activation rate is a speed of activating the lamps 105, e.g., measured as a frequency of lamp activations per unit time or a quantity of time from activating one of the lamps 105 to activating a next one of the lamps 105. The lamp activation rate may be faster than the frame rate of the image data 300 and slower than or equal to the line rate of the rolling shutter. By being faster than the frame rate of the image data 300, the lamp activation rate may be fast enough to be imperceptible to a person outside the vehicle 100, i.e., the person will not notice a flickering of the lamps 105. By being slower than or equal to the line rate of the rolling shutter, the lamp activation rate may take advantage of the rolling shutter to produce image data 300 usable by a photometric stereo algorithm as described below despite being faster than the frame rate of the image data 300.

The computer 205 is programmed to receive the image data 300 of the scene generated while sequentially activating the lamps 105 as captured with the rolling shutter. The image data 300 generated in this manner is useful for interlacing the lines 310 as will be described below, so as to apply the photometric stereo algorithm. FIG. 3 indicates which lamps 105 are activated as each line 310 of three example image frames 305a-c are captured with the rolling shutter, with three circles next to each line 310 representing the status of three lamps 105a-c while that line 310 is captured. A white circle indicates that the lamp 105 is activated, and a black circle indicates that the lamp 105 is deactivated. In the example of FIG. 3, the first lamp 105a is activated and the second and third lamps 105b,c are deactivated while the first line 310 of the first image frame 305a is captured, the second lamp 105b is activated and the first and third lamps 105a,c are deactivated while the second line 310 of the first image frame 305a is captured, the third lamp 105c is activated and the first and second lamps 105a,b are deactivated as the third line 310 of the first image frame 305a is captured, and so on.

The computer 205 may be programmed to receive a baseline image frame. The baseline image frame may be an image frame captured by the camera 115 while none of the lamps 105 are activated, i.e., on. For example, the computer 205 may deactivate the lamps 105 for a brief period and receive the baseline image frame while the lamps 105 are deactivated. For example, the computer 205 may receive the baseline image frame while sequentially activating the lamps 105, e.g., after deactivating one of the lamps 105 and before activating a next one of the lamps 105.

The computer 205 may be programmed to mask a portion of the image frames 305, i.e., to generate a mask covering the portion of the image frame 305. The portion of the image frame 305 may include pixels that are not useful for the photometric stereo algorithm described below or that make accurate measurement with the photometric stereo algorithm more difficult. For example, the computer 205 may mask pixels in regions that do not change from the baseline image frame with the sequential activation of the lamps 105, e.g., that do not change with at least one of the lamps 105. The unchanging pixels may be from objects that are too far away to be illuminated by the lamps 105 or that are occluded from at least one of the lamps 105. For another example, the computer 205 may mask pixels corresponding to objects having specular surfaces, i.e., mirror-like surfaces, which may be more difficult for the photometric stereo algorithm to analyze than diffuse surfaces. The computer 205 may detect specular surfaces from high variation in intensities in the region corresponding to the surface.

The computer 205 may be programmed to interlace a subset of the lines 310 from consecutive ones of the image frames 305. The subset of the lines 310 may be captured while a same one of the lamps 105 is activated. Interlacing the lines 310 may result in a constructed image frame in which all the lines 310 were captured while a same one of the lamps 105 is activated. For example, in a first image frame 305a, the first line 310, fourth line 310, seventh line 310, etc. may be captured while the first lamp 105a is activated. In a second image frame 305b, the third line 310, sixth line 310, ninth line 310, etc. may be captured while the first lamp 105a is activated. In a third image frame 305c, the second line 310, the fifth line 310, the eighth line 310, etc. may be captured while the first lamp 105a is activated. Interlacing the lines 310 captured while the first lamp 105a is activated results in a first constructed image frame with the first line 310 from the first image frame 305a, the second line 310 from the third image frame 305c, the third line 310 from the second image frame 305b, the fourth line 310 from the first image frame 305a, the fifth line 310 from the third image frame 305c, the sixth line 310 from the second image frame 305b, and so on. Similarly, the computer 205 may interlace the lines 310 from the first image frame 305a, second image frame 305b, and third image frame 305c captured while the second lamp 105b is activated, resulting in a second constructed image frame, and the computer 205 may interlace the lines 310 from the first image frame 305a, second image frame 305b, and third image frame 305c captured while the third lamp 105c is activated, resulting in a third constructed image frame.

The computer 205 is programmed to generate a map of surface normals of the scene. A map of surface normals is a map of vectors normal to a surface of an object viewed by the camera 115. Each vector is a three-dimensional spatial vector that is normal, i.e., orthogonal or perpendicular, to a small portion of a surface of an object in the environment, and the vectors thereby define the orientation of the surfaces. The vectors may be unit vectors that are unitless. The vectors are mapped to a position in the image frame 305 of the camera 115. For example, the map of surface normals N may be a p×3 matrix in which p is the number of pixels in an image frame 305 and each row is a three-dimensional normal vector corresponding to one of the pixels in the image frame 305.

The computer 205 is programmed to generate the map of surface normals of the scene by executing a photometric stereo algorithm on the image data 300. The photometric stereo algorithm takes as input image frames of the scene under different lighting conditions, e.g., the constructed image frames resulting from the interlacing of the lines 310 described above, as well as the direction of light from the lamp 105. The photometric stereo algorithm may be limited to an unmasked portion of the image frames. The unmasked portion may be the portion not covered by the mask generated as described above. The constructed image frames may be represented as a p×m matrix I for which m is the number of constructed image frames and each column is the intensities of the pixels in one of the constructed image frames. Each intensity in the matrix I may be a change in intensity between when the respective lamp 105 is activated versus when that lamp 105 is deactivated, e.g., when none of the lamps 105 are activated, i.e., the baseline image frame, in order to isolate the effect of the lamp 105. The light direction may be represented by a 3×m matrix L in which each column is a three-dimensional vector representing the direction that the lamp 105 is aimed for one of the constructed image frames. For example, the photometric stereo algorithm may include solving the following equation for the map of surface normals N:

$$I = k_d N \cdot L$$

in which $k_d$ is a scale factor to compensate for lens optics of the lamps 105 and the angles formed by the light rays with the scene. The angles may be determined based on an estimated distance to the scene, which is determined as described below. The equation may be solved via parameter solving with outlier detection such as random sample consensus (RANSAC) or a similar technique. For another example, the photometric stereo algorithm may determine the map of surface normals N by executing a machine-learning program, e.g., a neural network.

The computer 205 may be programmed to generate a depth map of the scene based on the map of the surface normals. For example, the computer 205 may integrate along a surface defined by the normal vectors starting at a point with a known depth from the camera 115. The surface is defined by the normal vectors in that each normal vector is orthogonal to the slope of the surface at that point. The known depth to one of the points may come from data from other sensors beside the camera 115, e.g., the range sensor 120 or two cameras 115 in a stereoscopic formation. For another example, the computer 205 may execute machine-learning program, e.g., a neural network, to generate the depth map. The same neural network may be used as for determining the map of the surface normals, with layers for the map of surface normals followed by layers for the depth map. The depth map may provide more detailed depth information than the other sensors, e.g., the range sensor 120, or more detailed information in certain circumstances, e.g., more detailed than the stereoscopic cameras 115 in low-light situations, or the depth may increase an accuracy of sensor fusion described below, e.g., in certain circumstances such as low-light situations.

The computer 205 may be programmed to fuse the depth map from the map of the surface normals with other data, e.g., other three-dimensional data from sensors of the vehicle. Sensor fusion is combining data from disparate sources together so that the resulting data has less uncertainty than if the data from each source were used individually, e.g., in creating a unified model of the surrounding environment of the vehicle. The sensor fusion can be performed with one or more algorithms, e.g., Kalman filter, central limit theorem, Bayesian networks, Dempster-Shafer, convolutional neural networks, etc. For example, the other three-dimensional data may include structure from motion. Structure from motion (SfM) is a photogrammetric range imaging technique for estimating three-dimensional structures from two-dimensional image sequences, e.g., the image data from the camera 115, that may be coupled with local motion signals. For another example, the other three-dimensional data may include the range data from the range sensor 120.

The computer 205 may be programmed to identify an object in the scene based on the map of the surface normals, e.g., based on the depth map. The computer 205 may identify the type of the object using conventional image-recognition techniques, e.g., a convolutional neural network programmed to accept images as input and output an identified type of object. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. As intermediate or further steps in identifying the type of object, the computer 205 uses the depth map or the map of surface normals. For example, the depth map and/or the map of surface normals can be layers in the convolutional neural network. The same neural network may be used as for determining the map of the surface normals, with layers for the map of surface normals followed by layers for the object identification. Using the depth map and/or the map of surface normals can provide additional information for more accurate classifications than conventional image recognition, and can help the classification occur in situations difficult for conventional image recognition, such as low-light conditions or an out-of-focus object. The final layer of the convolutional neural network generates a score for each potential type of object, and the final output is the type of object with the highest score.

The computer 205 may be programmed to navigate the vehicle 100 based on the map of the surface normals in response to a condition being satisfied, and to not navigate the vehicle 100 based on the map of the surface normals in response to the condition not being satisfied. The condition may be based on a status of the autonomous-operation features, a speed of the vehicle 100, an ambient light level, and/or a distance to an object in the scene. For example, condition may include that an autonomous-operation feature is active, the speed of the vehicle 100 is below a speed threshold, the ambient light level is below a light threshold, and the distance to the object is below a distance threshold, as will each be described in detail below. Alternatively or additionally, the condition may include that a combination of the speed of the vehicle 100, the ambient light level, and the distance to the object is below a combined threshold.

The condition may be or include that the autonomous-operation feature is active. The computer 205 may determine that one of the autonomous-operation features is active. For example, the computer 205 may set a value of a flag to true in response to an input from the operator to activate the autonomous-operation feature and may set the value of the flag to false in response to an input from the operator to deactivate the autonomous-operation feature. The computer 205 may navigate the vehicle 100 based on the map of the surface normals in response to the autonomous-operation feature being active.

The condition may be or include that the speed of the vehicle 100 is below the speed threshold. The computer 205 may determine the speed of the vehicle 100, e.g., by receiving data from the speed sensor 215 indicating the speed. The speed threshold may be chosen based on an effective distance over which the change in intensities from activating the lamps 105 can be detected by the camera 115; e.g., the speed threshold may be a speed such that the vehicle 100 is capable of stopping in less than the effective distance. The computer 205 may navigate the vehicle 100 based on the map of the surface normals in response to the speed of the vehicle 100 being below the speed threshold.

The condition may be or include that the ambient light level is below the light threshold. The computer 205 may determine the ambient light level, e.g., based on an average intensity of the image data 300, e.g., calculated using the baseline image frame. The light threshold may be chosen to be a level at which the photometric stereo algorithm provides more accurate data than other sources of depth data, e.g., stereo cameras. The computer 205 may determine the ambient light level using a subset of the image data 300, e.g., a subset of the baseline image frame, e.g., the unmasked portion of one of the image frames 300 such as the baseline image frame. The computer 205 may navigate the vehicle 100 based on the map of the surface normals in response to the ambient light level being below the light threshold.

The condition may be or include that the distance to an object in the scene is below the distance threshold. The computer 205 may determine the distance to an object in the scene from the range data from the range sensor 120 or stereometric data from stereo cameras 115. The potential objects to which to measure the distance may be restricted to those corresponding to the unmasked portion of the image frame 305. The distance threshold may be chosen to be no greater than the effective distance over which the change in intensities from activating the lamps 105 can be detected by the camera 115. The computer 205 may navigate the vehicle 100 based on the map of the surface normals in response to the distance to the object being below the distance threshold.

The condition may be or include that a combination of the speed of the vehicle 100, the ambient light level, and the distance to the object is below a combined threshold. The combined threshold may be a surface in a three-dimensional space with dimensions for the speed of the vehicle 100, the ambient light level, and the distance to an object in the scene. For example, the surface may be a linear surface passing through the speed threshold when the ambient light level is zero and the distance is zero, the light threshold when the speed is zero and the distance is zero, and the distance threshold when the ambient light level is zero and the speed is zero. The surface may be represented by the speed threshold being variable, e.g., being a function of the ambient light level and the distance to an object in the scene. The speed threshold may decrease as the ambient light level increases up to the light threshold, and the speed threshold may decrease as the distance increases up to the distance threshold. For example, the speed threshold may represent a linear surface, as in the following equation:

$$s_T = s_{T,up}\left(-\frac{l}{l_T} - \frac{d}{d_T} + 1\right)$$

in which $s_T$ is the variable speed threshold, $s_{T,up}$ is an upper limit for the variable speed threshold, l is the ambient light level, $l_T$ is the light threshold, d is the distance to an object in the scene, and $d_T$ is the distance threshold. The same linear surface may be equivalently represented as a variable light threshold or a variable distance threshold.

The computer 205 is programmed to, in response to the condition being satisfied, navigate the vehicle 100 based on the map of the surface normals, e.g., according to the autonomous-operation feature. For example, the computer 205 may navigate the vehicle 100 based on the depth map. The computer 205 may actuate the propulsion system 220, the brake system 225, and/or the steering system 230 to try to avoid obstacles in the scene when navigating to a parking spot, a charging location, or a coupler of a trailer according to the respective autonomous-operation feature. The computer 205 may actuate the brake system 225 according to an automatic braking feature to try to avoid an object detected in the depth map. For another example, the computer 205 may navigate the vehicle 100 based on the identification of the object. The computer 205 may identify an object relevant to the autonomous-operation feature, e.g., a wireless charging pad, a parking spot, or a trailer ball, and actuate the propulsion system 220, the brake system 225, and/or the steering system 230 to navigate the vehicle 100 to a pre-specified position and orientation relative to the identified object.

The computer 205 may be programmed to, in response to the condition not being satisfied, refrain from navigating the vehicle 100 based on the map of the surface normals. The computer 205 may refrain from navigating the vehicle 100 according to the autonomous-operation feature, or the computer 205 may navigate the vehicle 100 according to the autonomous-operation feature not based on the map of the surface normals. For example, the computer 205 may not navigate the vehicle 100 according to the autonomous-operation feature in response to the condition not being met and another source of data about the scene not being available. In that case, the operator may navigate the vehicle 100 nonautonomously. For another example, the computer 205 may, in response to the condition not being met and another source of data about the scene being available, navigate the vehicle 100 according to the autonomous-operation feature based on the source of data. The source of data may be, e.g., the range sensor 120, stereoscopic cameras 115, or other sensors of the vehicle 100.

Figure 4:
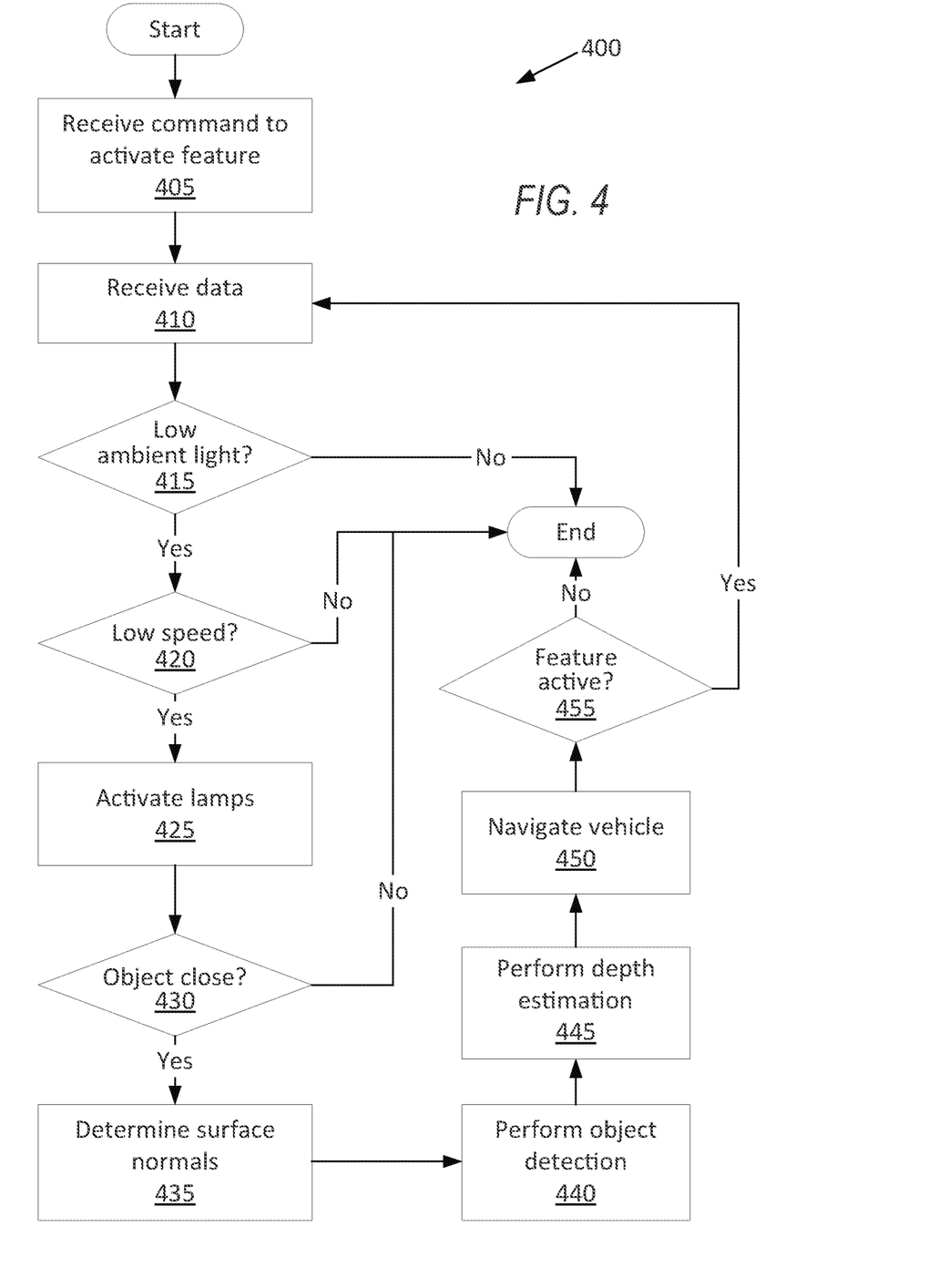
FIG. 4 is a flowchart of an example process for using photometric stereo on the image data to navigate the vehicle.

FIG. 4 is a process flow diagram illustrating an example process 400 for navigating the vehicle 100 using the photometric stereo algorithm. The memory of the computer 205 stores executable instructions for performing the steps of the process 400 and/or programming can be implemented in structures such as mentioned above. As a general overview of the process 400, the computer 205 receives a command to activate one of the autonomous-operation features and receives data from the sensors 115, 120. In response to the ambient light level being below the light threshold and the speed being below the speed threshold, the computer 205 sequentially activates the lamps 105. In response to the distance to an object in the scene being below the distance threshold, the computer 205 generates the map of the surface normals, identifies an object in the scene, generates the depth map, and navigates the vehicle 100 according to the autonomous-operation feature. The process 400 repeats for as long as the autonomous-operation feature remains active.

The process 400 begins in a block 405, in which the computer 205 determines that one of the autonomous-operation features of the vehicle 100 is active, e.g., by receiving a command from an operator to activate the autonomous-operation feature.

Next, in a block 410, the computer 205 receives data from the sensors, e.g., the image data 300 from the cameras 115, range data from the range sensor 120, the speed of the vehicle 100 from the speed sensor 215, etc.

Next, in a decision block 415, the computer 205 determines whether the ambient light level is below the light threshold, as described above. The computer 205 determines the ambient light level, as described above. In response to the ambient light level being below the light threshold, the process 400 proceeds to a decision block 420. In response to the ambient light level being above the light threshold, the computer 205 refrains from navigating the vehicle 100 based on the map of surface normals, and the process 400 ends.

In the decision block 420, the computer 205 determines whether the speed of the vehicle 100 is below the speed threshold, as described above. In response to the speed being below the speed threshold, the process 400 proceeds to a block 425. In response to the speed being above the speed threshold, the computer 205 refrains from navigating the vehicle 100 based on the map of surface normals, and the process 400 ends.

In the block 425, the computer 205 sequentially activates the lamps 105 and receives the image data 300 generated by the camera 115 while sequentially activating the lamps 105, as described above.

Next, in a decision block 430, the computer 205 determines whether the distance to an object in the scene is below the distance threshold, as described above. The computer 205 determines the distance to an object in the scene, e.g., based on the range data from the range sensor 120, as described above. In response to the distance being below the distance threshold, the process 400 proceeds to a block 435. In response to the distance being above the distance threshold, the computer 205 refrains from navigating the vehicle 100 based on the map of surface normals, and the process 400 ends.

In the block 435, the computer 205 generates the map of the surface normals based on the image data 300 generated by the camera 115 while sequentially activating the lamps 105, as described above.

Next, in a block 440, the computer 205 identifies an object in the scene based on the map of the surface normals, as described above.

Next, in a block 445, the computer 205 generates the depth map of the scene based on the map of the surface normals, as described above.

Next, in a block 450, the computer 205 navigates the vehicle 100 based on the map of the surface normals according to the autonomous-operation feature, e.g., based on the identification of the object, the depth map, and/or sensor fusion, as described above.

Next, in a decision block 455, the computer 205 determines whether the autonomous-operation feature of the vehicle 100 is still active. In response to the autonomous-operation feature being active, the process 400 returns to the block 410 to continue receiving data from the sensors. In response to the autonomous-operation feature being deactivated, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
   sequentially activate a plurality of lamps aimed at a scene, the lamps mounted to a vehicle;
   receive image data of the scene generated while sequentially activating the lamps;
   generate a map of surface normals of the scene by executing a photometric stereo algorithm on the image data;
   in response to a speed of the vehicle being below a speed threshold, navigate the vehicle based on the map of the surface normals; and
   in response to the speed of the vehicle being above the speed threshold, refrain from navigating the vehicle based on the map of the surface normals.

2. The computer of claim 1, wherein the instructions to receive the image data include instructions to receive the image data as captured with a rolling shutter.

3. The computer of claim 2, wherein the instructions to sequentially activate the lamps include instructions to sequentially activate the lamps at a lamp activation rate that is faster than a frame rate of the image data and slower than or equal to a line rate of the rolling shutter.

4. The computer of claim 3, wherein the image data includes a series of image frames, the image frames are composed of lines, and the instructions to execute the photometric stereo algorithm include instructions to interlace a subset of the lines from consecutive ones of the image frames, the subset of lines being captured while a same one of the lamps is activated.

5. The computer of claim 1, wherein the instructions further include instructions to, while sequentially activating the lamps, deactivate each lamp before activating a next one of the lamps.

6. The computer of claim 1, wherein the plurality of the lamps includes at least three lamps.

7. The computer of claim 1, wherein the instructions further include instructions to generate a depth map of the scene based on the map of the surface normals and, in response to the speed of the vehicle being below the speed threshold, navigate the vehicle based on the depth map.

8. The computer of claim 1, wherein the instructions further include instructions to identify an object in the scene based on the map of the surface normals and, in response to the speed of the vehicle being below the speed threshold, navigate the vehicle based on the identification of the object.

9. The computer of claim 1, wherein the instructions further include instructions to determine an ambient light level and, in response to the speed of the vehicle being below the speed threshold and the ambient light level being below a light threshold, navigate the vehicle based on the map of the surface normals.

10. The computer of claim 9, wherein the speed threshold is variable, and the instructions further include instructions to determine the speed threshold based on the ambient light level.

11. The computer of claim 10, wherein the speed threshold decreases as the ambient light level increases up to the light threshold.

12. The computer of claim 1, wherein the instructions further include instructions to determine a distance to an object in the scene and, in response to the speed of the vehicle being below the speed threshold and the distance to the object being below a distance threshold, navigate the vehicle based on the map of the surface normals.

13. The computer of claim 12, wherein the instructions further include instructions to determine an ambient light level and, in response to the speed of the vehicle being below the speed threshold, the distance to the object being below the distance threshold, and the ambient light level being below a light threshold, navigate the vehicle based on the map of the surface normals.

14. The computer of claim 12, wherein the speed threshold is variable, and the instructions further include instructions to determine the speed threshold based on the distance to the object.

15. The computer of claim 14, wherein the speed threshold decreases as the distance increases up to the distance threshold.

16. The computer of claim 1, wherein the instructions further include instructions to determine that an autonomous-operation feature of the vehicle is active and, in response to the speed of the vehicle being below the speed threshold and the autonomous-operation feature being active, navigate the vehicle based on the map of the surface normals according to the autonomous-operation feature.

17. The computer of claim 16, wherein the autonomous-operation feature is remote park assist.

18. The computer of claim 16, wherein the autonomous-operation feature is navigating the vehicle to a charging location.

19. The computer of claim 16, wherein the autonomous-operation feature is navigating the vehicle to hitch a trailer to the vehicle.

20. A method comprising:
sequentially activating a plurality of lamps aimed at a scene, the lamps mounted to a vehicle;
receiving image data of the scene generated while sequentially activating the lamps;
generating a map of surface normals of the scene by executing a photometric stereo algorithm on the image data;
in response to a speed of the vehicle being below a speed threshold, navigating the vehicle based on the map of the surface normals; and
in response to the speed of the vehicle being above the speed threshold, refraining from navigating the vehicle based on the map of the surface normals.

* * * * *